(12) United States Patent
Ramamoorthy et al.

(10) Patent No.: US 9,560,507 B2
(45) Date of Patent: Jan. 31, 2017

(54) METHOD TO IMPROVE EMERGENCY CALL CONTINUITY BY ALLOWING INBOUND MOBILITY TOWARDS NON-MEMBER CSG CELLS

(71) Applicant: Samsung Electronics Co., Ltd., Suwon-si, Gyeonggi-do (KR)

(72) Inventors: Shrinath Ramamoorthy, Bangalore (IN); Nitin Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/438,108

(22) PCT Filed: Jun. 11, 2013

(86) PCT No.: PCT/KR2013/005140
§ 371 (c)(1),
(2) Date: Apr. 23, 2015

(87) PCT Pub. No.: WO2014/065483
PCT Pub. Date: May 1, 2014

(65) Prior Publication Data
US 2015/0296356 A1    Oct. 15, 2015

(30) Foreign Application Priority Data

Oct. 23, 2012 (IN) .......................... 4419/CHE/2012

(51) Int. Cl.
| | | |
|---|---|---|
| *H04W 4/08* | (2009.01) | |
| *H04W 4/22* | (2009.01) | |
| *H04W 76/00* | (2009.01) | |
| *H04W 4/02* | (2009.01) | |
| *H04W 48/02* | (2009.01) | |
| *H04W 36/00* | (2009.01) | |
| *H04W 48/20* | (2009.01) | |

(52) U.S. Cl.
CPC ............... *H04W 4/22* (2013.01); *H04W 4/023* (2013.01); *H04W 76/007* (2013.01); *H04W 36/0061* (2013.01); *H04W 48/02* (2013.01); *H04W 48/20* (2013.01)

(58) Field of Classification Search
CPC ...... H04W 4/22; H04W 4/023; H04W 76/007; H04W 48/20
USPC ........ 455/404.1, 404.2, 456.1; 370/254, 329, 370/331
See application file for complete search history.

(56) References Cited

U.S. PATENT DOCUMENTS 8,072,953 B2    12/2011  Mukherjee et al.
2011/0171915 A1    7/2011  Gomes et al.

FOREIGN PATENT DOCUMENTS

| KR | 10-2010-0017801 A | 2/2010 |
| KR | 10-2010-0085442 A | 7/2010 |
| KR | 10-2011-0005786 A | 1/2011 |
| WO | 2009/131427 A2 | 10/2009 |
| WO | 2012/138125 A2 | 10/2012 |

*Primary Examiner* — Sam Bhattacharya
(74) *Attorney, Agent, or Firm* — Jefferson IP Law, LLP

(57) ABSTRACT

A method and system to improve emergency call continuity by allowing inbound mobility towards non-member CSG cells is disclosed. The method enables the UE to detect an emergency call. Then the UE initiates an autonomous search procedure by itself, without need for network to configure the UE for proximity reporting. The method enables the UE to use non-member CSG cells for continuity of emergency calls. The method also enables the UE to confirm emergency call handling support provided by the target CSG cell before initiating handover.

10 Claims, 5 Drawing Sheets

METHOD TO IMPROVE EMERGENCY CALL CONTINUITY BY ALLOWING INBOUND MOBILITY TOWARDS NON-MEMBER CSG CELLS

TECHNICAL FIELD

The present invention relates to providing emergency call continuity and more particularly relates to allowing inbound mobility towards non-member Closed Subscriber Group (CSG) cells.

BACKGROUND ART

Communication network operators give highest priority to Emergency Calls (EC). With wide spread use of mobile phones communication networks need to have an enhanced emergency call handling infrastructure across cells. The emergency call handling infrastructure should be able to provide emergency call continuity for a roaming user. The inbound mobility refers to a network controlled, handover functionality for User Equipment (UE) in Radio Resource Control (RRC) connected state with an established connection to the network.

In Long Term Evolution (LTE) as per third generation partnership project (3GPP) standard the networks support handover of the calls across the cells. The UE in connected mode measures only the cells on frequencies configured by the network and reports the measurement results based on event or on periodical reporting criteria. Autonomous search procedure allows the UE to search for the Closed Subscriber Group (CSG) cells present on those frequencies, for which the UE is not configured by the network. As per 3GPP specifications, 36.331 and 36.304, the UE in connected mode starts the autonomous search procedure only when the network configures the UE for proximity reporting. The UE can transmit proximity report for the detected CSG cell only if the CSG cell is present in its CSG whitelist (member CSG cell).

Moreover, in the existing methods the UE reports proximity indication of the detected member CSG cell even though the member CSG cell fails to support emergency call service. The UE follows the autonomous search procedure irrespective of type of the call, which can be an emergency call or a normal (regular) call. With existing method, the UE is unable to utilize available services of the non-member CSG cell which is not part of its white list. Thus, the UE never reports proximity of the detected non-member CSG cell to the network. If the UE fails to detect another member CSG cell the emergency call maybe discontinued.

Due to above mentioned reasons, existing methods following the 3GPP standard specification 36, fail to provide emergency call continuity in non-member CSG cells. The existing method relies on the network to configure the UE for initiating autonomous search procedure and delay in the process may result in discontinuation of the emergency call.

DISCLOSURE OF INVENTION

Solution to Problem

The principal object of the embodiments herein is to provide emergency call continuity by allowing inbound mobility towards the non-member Closed Subscriber Group (CSG) cells.

Another object of the invention is to provide a mechanism in the UE to detect the emergency call.

Another object of the invention is to provide a mechanism in the UE to initiate autonomous search procedure on detecting the emergency call.

Accordingly the invention provides a method for providing emergency call continuity for a user equipment (UE) in a communication network, wherein the method comprises detecting call type of the UE, initiating autonomous search procedure by the UE without a need for the communication network to configure the UE for proximity reporting, when the UE is in the emergency call, detecting a closed subscriber group (CSG) cell by the UE for inbound mobility, determining by the UE, if the CSG cell supports the emergency call, irrespective of whether the CSG cell is in white list of the UE and transmitting the proximity report of the CSG cell to the communication network by the UE, if the CSG cell supports the emergency call and if the CSG cell fails to support the emergency call the UE avoids transmitting the proximity report to the communication network.

Accordingly the invention provides a user equipment (UE) for achieving emergency call continuity in a communication network, wherein the UE comprises an integrated circuit further comprising at least one processor, at least one memory having a computer program code within the circuit, at least one memory and the computer program code configured to with at least one processor cause the UE to detect call type, wherein the call type comprises at least one of an emergency call or a normal call, initiate autonomous search procedure without the communication network, configuring the UE for proximity reporting, when the UE detects the emergency call, detect a closed subscriber group (CSG) cell for inbound mobility, determine if the CSG cell supports the emergency call, irrespective of whether the CSG cell is in white list of the UE and transmit the proximity report of the CSG to the communication network, if the CSG cell supports the emergency call and avoid transmitting the proximity report to the communication network, if the CSG cell fails to support the emergency call.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1:
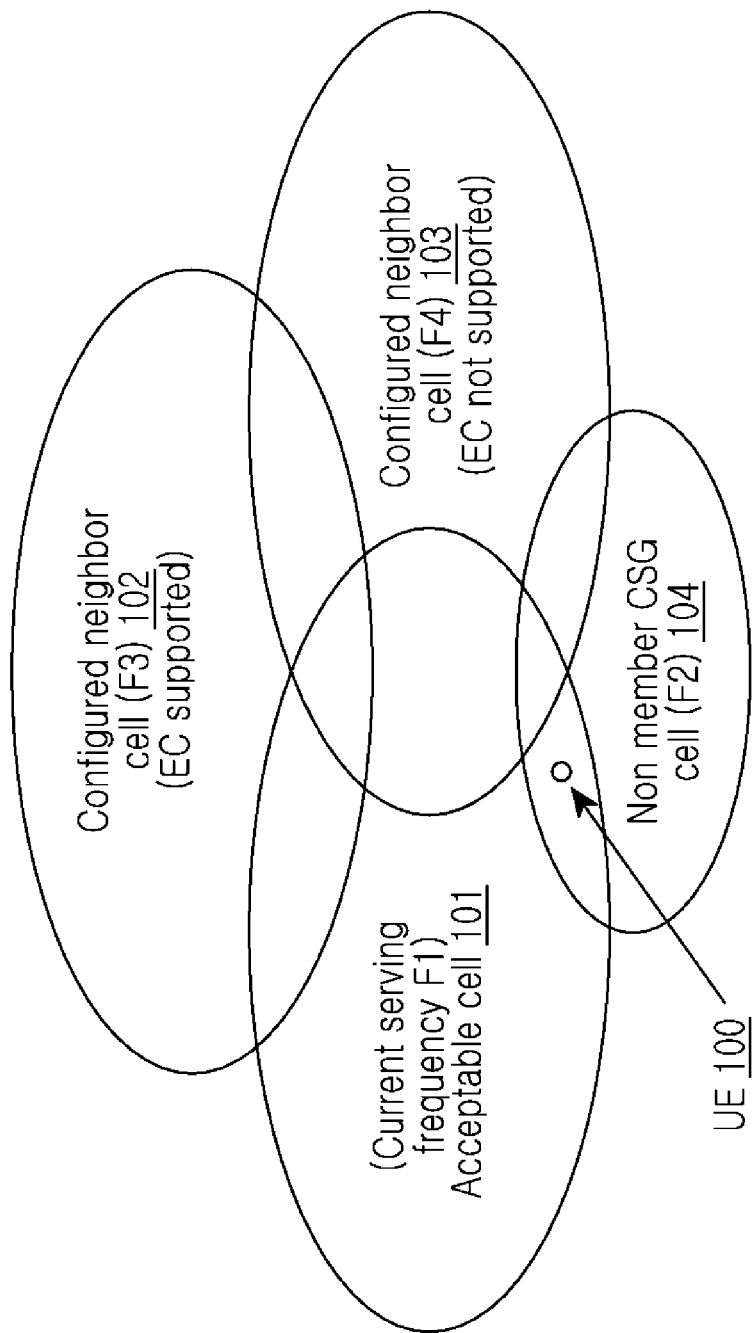
FIG. 1 illustrates an exemplary system for handling inbound mobility, in accordance with the 3GPP specifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system for emergency call continuity by allowing inbound mobility towards non-member CSG cell. The method proposes an enhancement over current 3GPP specifications 36.300, 36.331, and 36.304 that handle inbound mobility. The User Equipment (UE) in connected mode can detect an emergency call dialed by a user of the UE. The UE in response self-initiates an autonomous search procedure, without need for the network to configure the UE for proximity reporting. The method enables the UE to confirm emergency call handling support provided by of target CSG cell before initiating handover. Thus, the method ensures continuity of emergency call and reduces chances of dropping the emergency call. In an embodiment, the UE transmits the detected CSG cell measurement results to the network in the proximity reporting message. This avoids delay involved in measurement configuration and reporting, thus speeds up the inbound handover procedure.

In an embodiment, UE can be a smart phone, a tablet, a desktop, a personal computer, a personal digital assistant and so on.

As per the 3GPP standard the closed subscriber group (CSG) is a 3GPP term used to describe a limited set of users with connectivity access to a femtocell. A femtocell is a small cellular base station designed for use in residential or small business environments and connects the UE to the service provider's network through broadband. The Open Access mode of femtocell allows any user to access the femtocell. In 3GPP standard, Home Node B (HNB) represents a 3G femtocell and Home enodeB (HeNB) represents the LTE femtocell. The CSG Identity (CSG ID) is an identifier broadcast by a CSG cell or cells. This CSG ID is used by the UE to facilitate access for authorized members of the associated Closed Subscriber Group. An acceptable cell is a cell that satisfies certain conditions as specified in 3GPP standard. The UE can always attempt emergency calls on the acceptable cell. The UE can campon an allowed CSG cell, which, is also referred as a member CSG cell. The member CSG cell is a CSG cell included in the whitelist of the UE which contains the cell's CSG Identity (ID) information. The CSG whitelist (also called allowed list in REL-8 of 3GPP Access Stratum specification) is the list provided by Network Access Stratum (NAS) containing all the CSG Identities of the CSG cells to which the subscriber (UE) belongs.

The CSG cells in the UE's whitelist are referred as member CSG cells while those CSG cells whose ID's are not included in the UE's whitelist are referred as non-member CSG cells.

Referring now to the drawings, and more particularly to FIGS. 1 through 5, where similar reference characters denote corresponding features consistently throughout the figures, there are shown preferred embodiments.

FIG. 1 illustrates an exemplary system for handling inbound mobility, in accordance with the 3GPP specifications. The figure depicts the network with mixed deployment of cells in the LTE environment comprising an UE 100, an acceptable cell 101, a configured neighbour 102, a configured neighbour 103, and a non-member CSG cell 104. The UE 101 is camped on acceptable cell, with current serving frequency F1. As depicted in figure the acceptable cell may be a macro cell, a femtocell and the like. For example, the cell is a macro cell and the macrocell is a cell in a mobile phone network that provides radio coverage served by a high power cellular base station (tower). The UE 100 connection is preoccupied on an emergency call. In a mobile situation, the UE 100 can possibly move to another location and experience a fading network signal of the acceptable cell. The UE 100 has multiple options for handover, which, enable the UE to continue the on-going call. As per LTE network standard, the UE can approach a network configured neighbour based on measurement results. The figure depicts configured neighbour 102, with serving frequency F3 and in capacity to support the emergency call. In such a situation the configured neighbour 102, which has poor radio quality with respect to current location of UE 100, may not be a good choice for handover. The 3GPP standard handles inbound mobility towards member CSG cells; according to the specification 36.331, 36.300, and 36.304. This option enables the UE 100 to approach a member CSG cell. The figure depicts configured neighbour 103 as a member CSG cell, with serving frequency F4. The configured neighbour 103 does not support the emergency calls. Accordingly, the network configures the UE 100 for proximity reporting. The configured UE 100 further initiates autonomous search procedure. The autonomous search procedure enables UE 100 to search CSG cells for inbound mobility. This search is limited by 3GPP standard to only member CSG cells of UE 100. As per the 3GPP specification 36 the UE reports proximity for the member CSG cell 103 to the network. The proximity reporting is irrespective of whether the member CSG cell 103 supports or fails to support the emergency call. The cell 101, onto which UE 100 is camped and connected for emergency call, can initiate a handover phase for the UE 100 towards the cell 103 for which proximity was reported. The handover preparation phase initiated by network fails to prepare the member CSG cell 103 for handover as the member CSG cell 103 does not support the emergency calls. As a result the on-going emergency call may be discontinued. In such situations, if the UE 100 detects the non-member CSG cell 104 (with serving frequency F2) that supports the emergency calls; the 3GPP specification prevents the UE from reporting proximity of such non-member CSG cell. The existing method fails to use available services of the non-member CSG cell and reduces chances of emergency call continuity.

All CSG cells allow limited service camping in case of emergency calls and existing 3GPP specification fails to use this facility. The existing 3GPP specification for inbound mobility restricts use of non-member CSG cells for inbound mobility. The existing methods fail to differentiate between the emergency call and a normal call hence cannot provide dedicated autonomous search procedure for improving procedures for continuity emergency calls.

Figure 2:
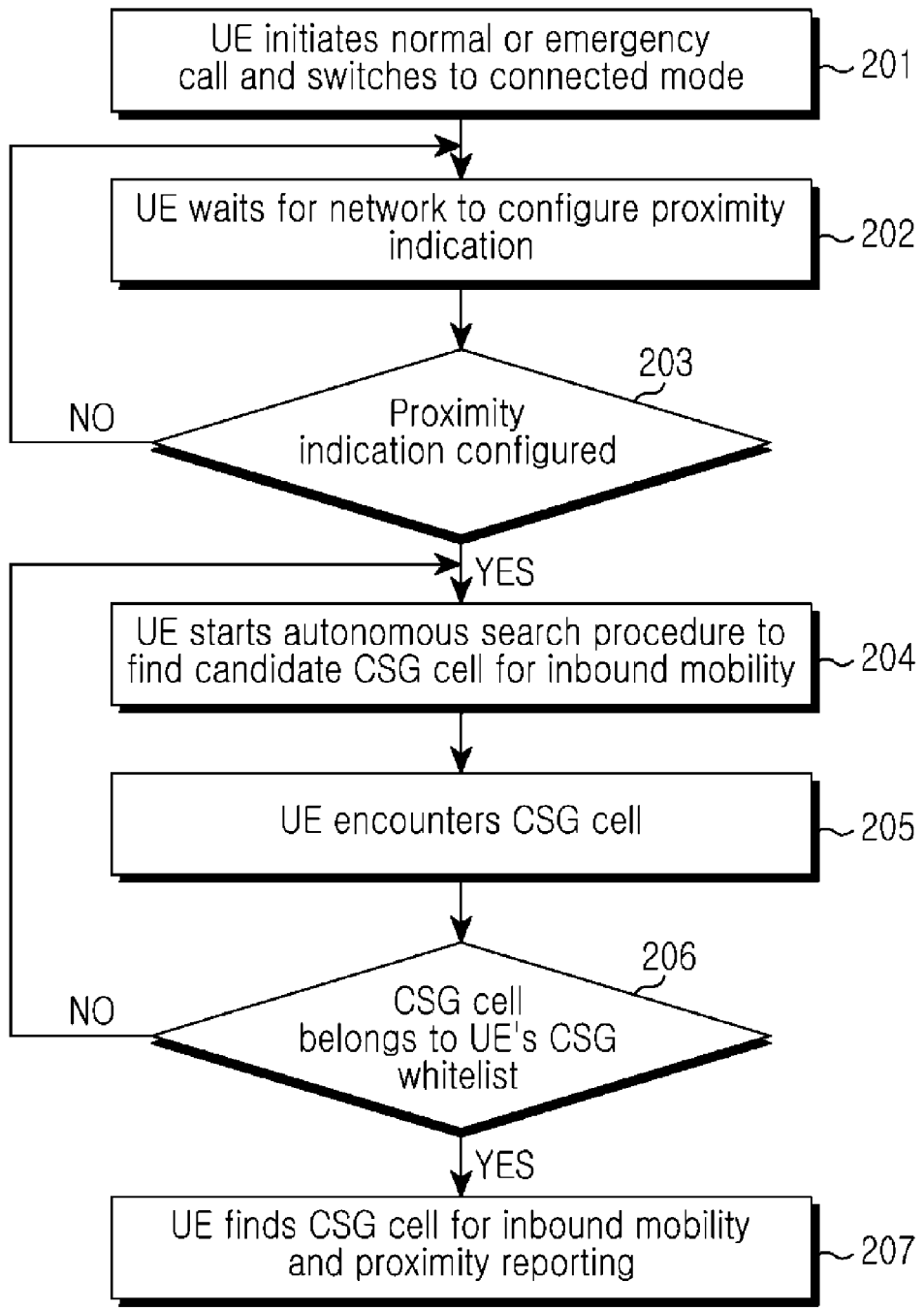
FIG. 2 illustrates a flow diagram of exemplary autonomous search procedure, in accordance with the 3GPP specifications.

FIG. 2 illustrates a flow diagram of exemplary autonomous search procedure, in accordance with the 3GPP specifications; the 3GPP standard follows specification 30.300, 36.304 and 36.331 to handle inbound mobility during emergency as well as a normal (regular) call. As depicted in the flow diagram 200 the UE 100 in the network initiates (201) the normal or the emergency call and switches to connected mode. Once the UE 100 attains connected mode status, the UE waits for the network to configure proximity indication through the RRC connection reconfiguration message. If the network configures (203) the UE 100 for proximity indication, the UE 100 starts (204) the autonomous search procedure to find candidate CSG cell for inbound mobility. Whenever the UE 100 encounters (205) any CSG cell, it verifies (206) the detected CSG cell's ID with the whitelist in the UE 100. If UE 100 finds the detected CSG cell in its whitelist (finds a member CSG cell), it indicates the network and transmits (207) proximity report with information of the detected CSG cell. The network further prepares the CSG cell for call handover.

If the network fails (203) to configure the UE 100 for proximity indication the UE 100 waits for the network to configure it. This introduces a delay in the process and increases risk of call drop before the handover operation. Such call drops fail to provide a better emergency call service. If the UE 100 fails to detect (206) the member CSG cell, the autonomous search procedure is repeated to search a new candidate CSG cell. The process introduces a time delay, moreover, if candidate CSG cell belonging to the UE's whitelist is not detected the emergency call may drop.

Figure 3:
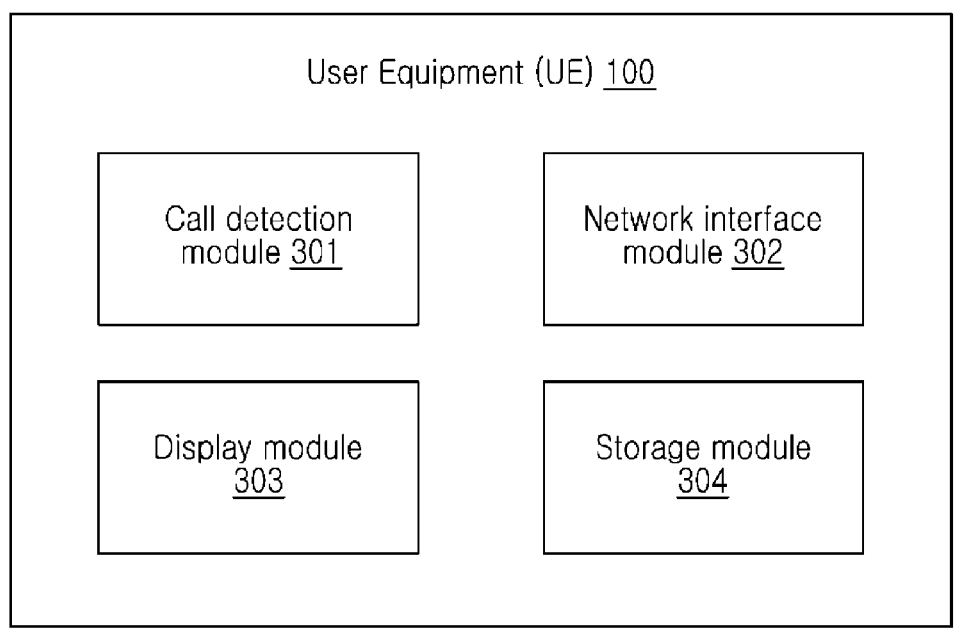
FIG. 3 illustrates a User Equipment (UE), according to the embodiments as disclosed herein.

FIG. 3 illustrates a User Equipment (UE), according to the embodiments as disclosed herein. The figure depicts a UE 100 which includes a call detection module 301, a network interface module 302, a display module 303 and a storage module 304. The call detection module 301 enables UE 100 to differentiate the emergency call from a normal call. The UE 100 communicates with the network through the network interface module 302. The network configures the UE 100 for proximity indication through the network interface module 302 during the normal call. The UE 100, which when preoccupied with a call, reports proximity indication of the detected candidate CSG cell to the network through the network interface module 302. The display module 303 provides the display interface to display necessary information on to the screen of UE 100. The storage module provides the memory space for storing information for call handling procedure, in addition to the standard memory functions. The storage module can include an internal and an external memory. For example, the storage module 304 can include Read only memory (ROM), Random access memory (RAM), a memory card and so on.

Figure 4:
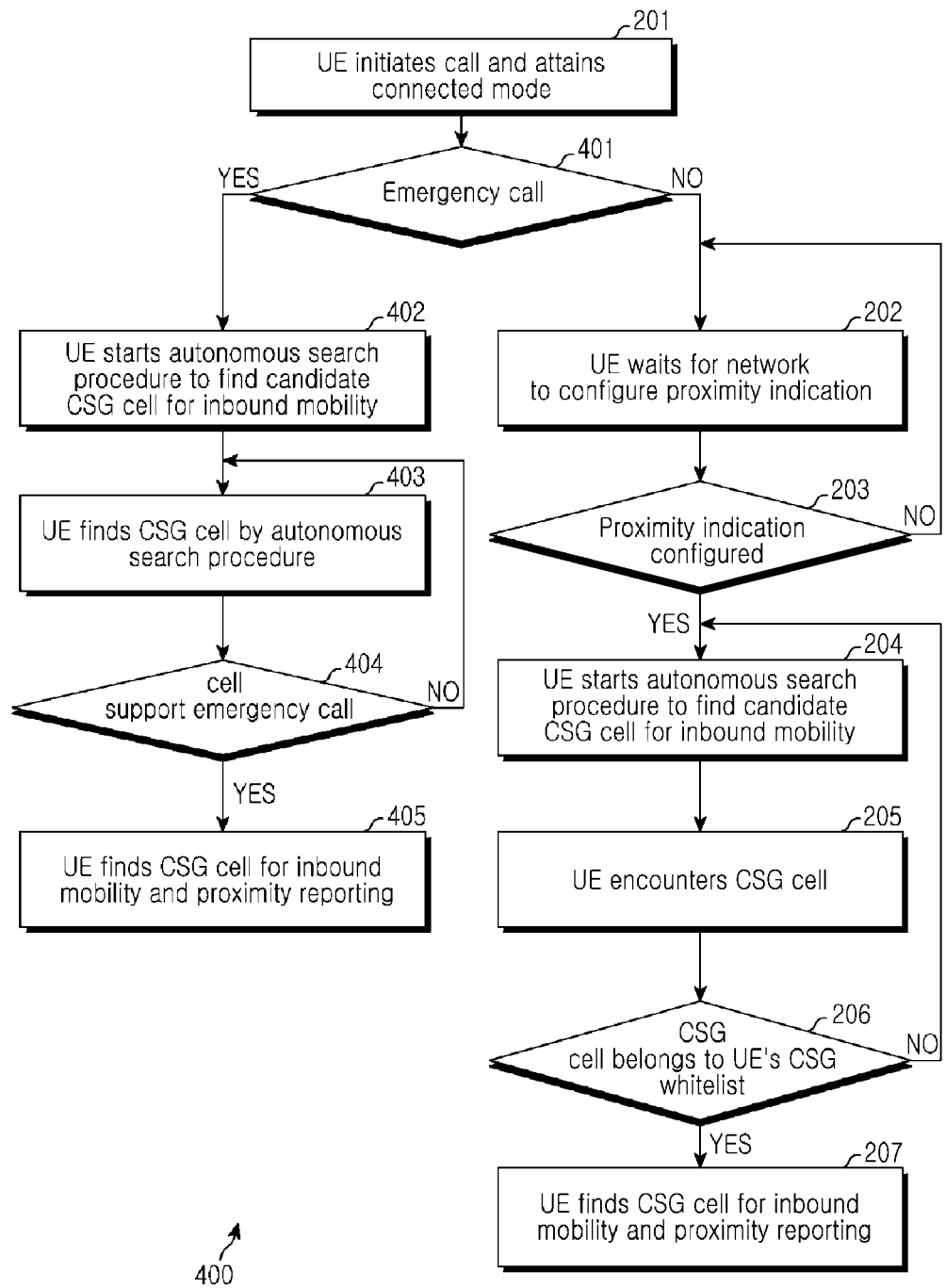
FIG. 4 illustrates a flow diagram of emergency call handling, according to the embodiments as disclosed herein.

FIG. 4 illustrates a flow diagram of emergency call handling, according to the embodiments as disclosed herein. As depicted in the flow diagram 400, the UE 100 initiates (201) a normal or an emergency call and switches to connected mode. If the UE detects (401) the emergency call, the UE 100 initiates (402) the autonomous search procedure, without the need for the network to configure the UE for proximity reporting. The autonomous search procedure enables the UE 100 to find a candidate CSG cell for inbound mobility. If the UE 100 finds (403) the candidate CSG cell, the method proposes a check to verify (404) if detected CSG cell supports the emergency call. If the detected CSG cell supports the emergency call, then the UE indicates the network and transmits (405) proximity report with information of the detected CSG cell.

If the detected CSG cell does not support the emergency call, the UE 100 repeats search to find (403) a new candidate CSG cell using autonomous search procedure. The UE avoids reporting proximity of detected CSG cell which is incapable of handling emergency calls. Thus, the method disclosed reduces uplink message and handover preparation phase at the source cell (current serving cell of the UE 100). The method also enables the UE 100 to report proximity of the detected CSG cell irrespective of the whitelist in the UE 100. Any detected non-member CSG cell capable of supporting emergency call can be selected for inbound mobility. Thus, method disclosed, reduces the risk of emergency call drop to a greater extent.

In an embodiment, the UE 100 may transmit the measurement results of the detected CSG to the network along with proximity reporting message. This avoids delay involved in measurement configuration and reporting thus speeding up the inbound handover procedure.

If the UE 100 detects (401) the call is a normal call then the UE 100 follows the 3GPP standard specification 36.300, 36.304 and 36.304 to handle inbound mobility. In case of normal call UE 100 waits (202) for network to configure proximity indication. If proximity indication is configured (203) the UE 100 starts (204) the autonomous search procedure. When the UE 100 encounters (205) a CSG cell, the UE 100 verifies (206) if detected CSG cell is included in the whitelist of UE 100. Upon confirmation with the whitelist, the detected CSG cell is reported (207) in the proximity report.

Thus for the normal call, if the network fails (203) to configure the UE 100 for proximity indication the UE waits for the network to configure it.

If the UE 100 fails to detect (206) a whitelist member CSG cell, the autonomous search procedure is repeated to search a new candidate CSG cell.

The proposed method enables the UE to differentiate between the emergency call and the normal call and handle each call with respective procedures.

Figure 5:
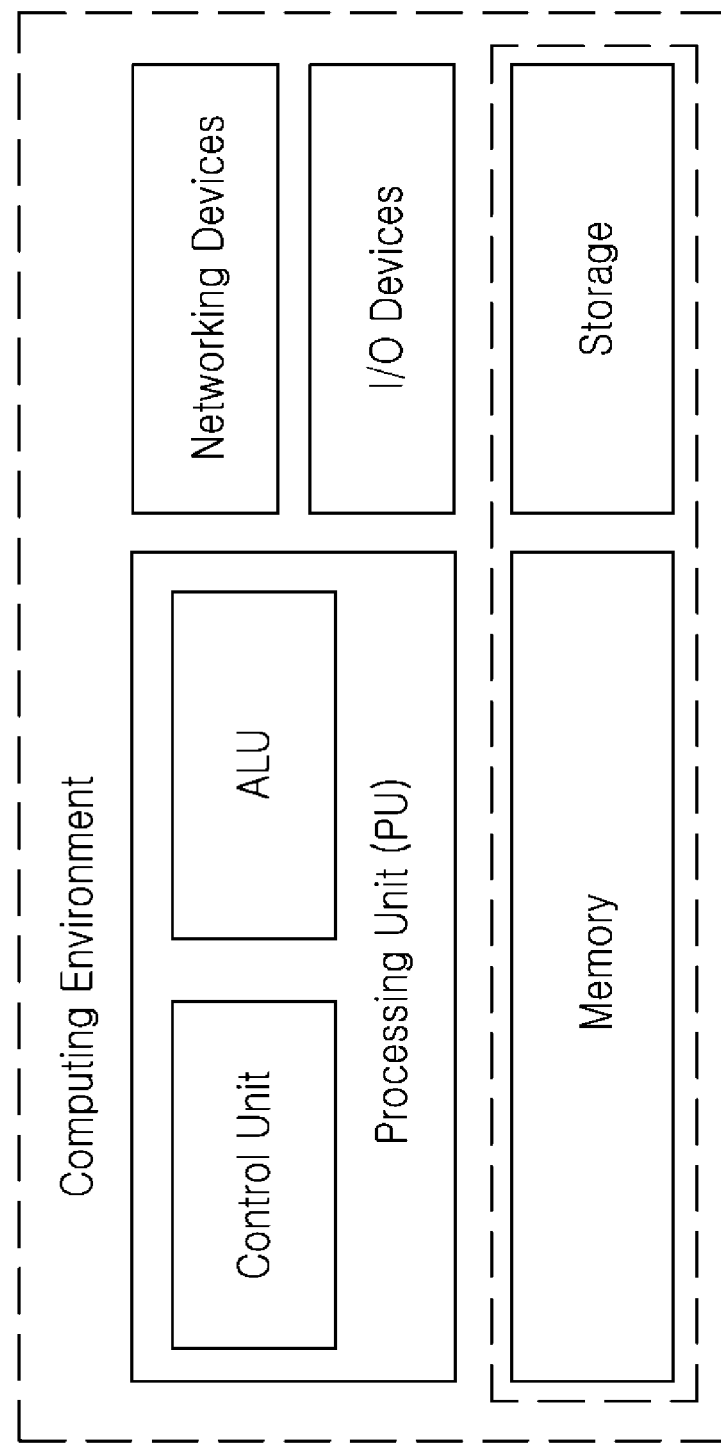
FIG. 5 illustrates a computing environment implementing the application, according to embodiments disclosed herein.

FIG. 5 illustrates a computing environment implementing the application, according to embodiments disclosed herein. As depicted the computing environment comprises at least one processing unit that is equipped with a control unit and an Arithmetic Logic Unit (ALU), a memory, a storage unit, plurality of networking devices, and a plurality Input output (I/O) devices. The processing unit is responsible for processing the instructions of the algorithm. The processing unit receives commands from the control unit in order to perform its processing. Further, any logical and arithmetic operations involved in the execution of the instructions are computed with the help of the ALU.

The overall computing environment can be composed of multiple homogeneous and/or heterogeneous cores, multiple CPUs of different kinds, special media and other accelerators. The processing unit is responsible for processing the instructions of the algorithm. The processing unit receives commands from the control unit in order to perform its processing. Further, any logical and arithmetic operations involved in the execution of the instructions are computed with the help of the ALU. Further, the plurality of process units may be located on a single chip or over multiple chips.

The algorithm comprising of instructions and codes required for the implementation are stored in either the memory unit or the storage or both. At the time of execution, the instructions may be fetched from the corresponding memory and/or storage, and executed by the processing unit.

In case of any hardware implementations various networking devices or external I/O devices may be connected to the computing environment to support the implementation through the networking unit and the I/O device unit.

The embodiments disclosed herein can be implemented through at least one software program running on at least one hardware device and performing network management functions to control the elements. The elements shown in FIGS. 3 and 5 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for operating a user equipment (UE) for achieving emergency call continuity in a communication network, the method comprising:
    detecting an emergency call initiated by the UE;
    initiating an autonomous search procedure by the UE, upon the detection of the emergency call;
    detecting a closed subscriber group (CSG) cell for inbound mobility;
    determining whether the detected CSG cell supports the emergency call; and
    in response to the determination that the detected CSG cell supports the emergency call, transmitting a proximity report of the detected CSG cell to the communication network.

2. The method of claim 1, wherein the proximity report comprises measurement results of the detected CSG cell.

3. The method of claim 1, wherein the inbound mobility to the detected CSG cell is allowed based on at least one of the emergency call and a normal call.

4. The method of claim 1, wherein the determining whether the detected CSG cell supports the emergency call comprises determining whether the detected CSG cell supports the emergency call, irrespective of whether the detected CSG cell is in a white list of the UE.

5. The method of claim 1, further comprising:
    in response to the determination that the detected CSG cell fails to support the emergency call, avoiding transmitting the proximity report to the communication network.

6. A user equipment (UE) for achieving emergency call continuity in a communication network, the UE comprising:
    an integrated circuit comprising at least one processor; and
    at least one memory configured to store a computer program code within the circuit, wherein the computer program code configured to, with the at least one processor, cause the UE to:
    detect an emergency call initiated by the UE;
    initiate an autonomous search procedure upon the detection of the emergency call;
    detect a closed subscriber group (CSG) cell for inbound mobility;
    determine whether the detected CSG cell supports the emergency call; and
    in response to the determination that the detected CSG cell supports the emergency call, transmit the proximity report of the detected CSG cell to the communication network.

7. The UE of claim 6, wherein the proximity report comprises measurement results of the detected CSG cell.

8. The UE of claim 6, wherein the inbound mobility to the detected CSG cell is allowed based on at least one of the emergency call and a normal call.

9. The UE of claim 6, wherein the computer program code causes the UE to determine whether the detected CSG cell supports the emergency call, irrespective of whether the detected CSG cell is in a white list of the UE.

10. The UE of claim 6, wherein the computer program code is further configured to cause the UE to avoid transmitting the proximity report to the communication network in response to the determination that the detected CSG cell fails to support the emergency call.

* * * * *